United States Patent
Kang et al.

(10) Patent No.: US 9,829,747 B2
(45) Date of Patent: Nov. 28, 2017

(54) LIQUID CRYSTAL DISPLAY PANEL AND METHOD OF MANUFACTURING THE SAME

(71) Applicant: SAMSUNG DISPLAY CO., LTD., Yongin, Gyeonggi-do (KR)

(72) Inventors: Suk-Hoon Kang, Seoul (KR); Yeong-Rong Park, Suwon-si (KR); Mi-Hwa Lee, Seoul (KR); Jun-Woo Lee, Seongnam-si (KR); Bong-Sung Seo, Suwon-si (KR); Baek-Kyun Jeon, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 497 days.

(21) Appl. No.: 14/313,184

(22) Filed: Jun. 24, 2014

(65) Prior Publication Data
US 2015/0205167 A1   Jul. 23, 2015

(30) Foreign Application Priority Data
Jan. 20, 2014   (KR) .......................... 10-2014-0006671

(51) Int. Cl.
*G02F 1/1337*   (2006.01)

(52) U.S. Cl.
CPC .. *G02F 1/133723* (2013.01); *G02F 1/133788* (2013.01); *Y10T 428/1023* (2015.01)

(58) Field of Classification Search
CPC ......... G02F 1/133723; G02F 1/133788; G02F 2001/133773; Y10T 428/1023
See application file for complete search history.

(56) References Cited

U.S. PATENT DOCUMENTS

| 6,063,829 | A | 5/2000 | Endou et al. |
| 7,075,607 | B2 | 7/2006 | Kim et al. |
| 7,742,138 | B2 | 6/2010 | Matsumori et al. |
| 2006/0061719 | A1* | 3/2006 | Tomioka ........... G02F 1/133723 349/123 |
| 2006/0072056 | A1* | 4/2006 | Nagai ............... G02F 1/133632 349/117 |
| 2007/0178250 | A1* | 8/2007 | Tomioka ............... G02F 1/1337 428/1.26 |
| 2011/0199565 | A1 | 8/2011 | Kunimatsu et al. |
| 2012/0300157 | A1 | 11/2012 | Kim et al. |

FOREIGN PATENT DOCUMENTS

| JP | 2004-206091 | 7/2004 |
| JP | 2007-183474 | 7/2007 |
| KR | 1020130050862 | 5/2013 |

* cited by examiner

*Primary Examiner* — Sophie Hon
(74) *Attorney, Agent, or Firm* — F. Chau & Associates, LLC

(57) ABSTRACT

A liquid crystal display panel includes a first substrate, a second substrate, a first alignment layer, a second alignment layer and a liquid crystal layer. The second substrate faces the first substrate. The liquid crystal layer is disposed between the first alignment layer and the second alignment layer. The first alignment layer and the second alignment layer each include a polyimide compound polymerized by cyclobutane-1,2,3,4-tetracarboxylic dianhydride and cyclobutane-1,2,3,4-tetracarboxylic dianhydride derivative.

8 Claims, 4 Drawing Sheets

LIQUID CRYSTAL DISPLAY PANEL AND METHOD OF MANUFACTURING THE SAME

CROSS REFERENCE TO RELATED APPLICATION

This application claims priority to Korean Patent Application No. 10-2014-0006671, filed on Jan. 20, 2014, the disclosure of which is hereby incorporated by reference herein in its entirety.

TECHNICAL FIELD

Exemplary embodiments of the inventive concept relate to a liquid crystal display panel and a method of manufacturing the same. More particularly, exemplary embodiments of the inventive concept relate to a liquid crystal display panel including an alignment layer increasing a hardness of the alignment layer and decreasing an afterimage of the liquid crystal display panel.

DISCUSSION OF THE RELATED ART

A liquid crystal display apparatus is one type of flat panel display (FPD), which has been used broadly recently. Examples of the flat panel display include, but are not limited to, a liquid crystal display ("LCD"), a plasma display panel ("PDP") and an organic light emitting display ("OLED").

The liquid crystal display apparatus applies voltages to molecules of liquid crystal to adjust arrangements of the molecules thereby changing optical characteristics of a liquid crystal cell such as, for example, birefringence, optical activity, dichroism and light scattering to display an image.

The liquid crystal display apparatus includes a liquid crystal display panel and a backlight assembly. Liquid crystal molecules of the liquid crystal display panel should be aligned in a direction to have uniform brightness and high contrast ratio.

For example, a polyimide compound may be coated on substrates of the liquid crystal display panel, and then the substrates may be rubbed by a cloth to form an alignment layer. When the substrates are rubbed by a cloth, dust may attach to the alignment layer and a scratch may occur on the alignment layer.

Recently, a photoalignment process has been used to increase transmissivity and decrease faults. However, an alignment layer formed by the photoalignment process may have a weak hardness and may cause an afterimage on a display panel.

SUMMARY OF THE INVENTIVE CONCEPT

Exemplary embodiments of the inventive concept provide a liquid crystal display panel including an alignment layer which has increased hardness and in which an afterimage of the liquid crystal display is decreased.

Exemplary embodiments of the inventive concept also provide a method of manufacturing the liquid crystal display panel.

According to an exemplary embodiment, a liquid crystal display panel includes a first substrate, a second substrate, a first alignment layer, a second alignment layer and a liquid crystal layer.

The second substrate faces the first substrate. The first alignment layer is disposed on the first substrate, and the first alignment layer includes a first compound including a first structural unit represented by the following Chemical Formula 1 and a second structural unit represented by the following Chemical Formula 2. An equivalent of the first structural unit of the first compound is greater than an equivalent of the second structural unit of the second compound. The second alignment layer is disposed on the second substrate, and the second alignment layer includes a second compound including the first structural unit and the second structural unit. An equivalent of the second structural unit of the second compound is greater than an equivalent of the first structural unit of the second compound. The liquid crystal layer is disposed between the first alignment layer and the second alignment layer.

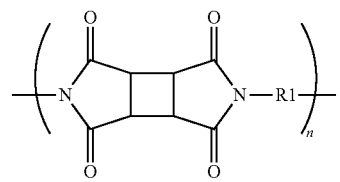

<Chemical Formula 1>

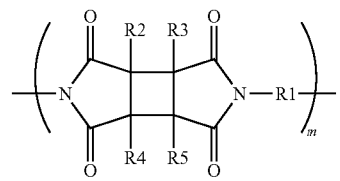

<Chemical Formula 2>

R1 represents a diamine group, R2, R3, R4, R5 respectively represents a hydrogen atom, a fluorine atom or an organic functional group having 1 to 5 carbons, and at least one of R2, R3, R4, R5 represents a fluorine atom or an organic functional group having 1 to 5 carbons.

In an exemplary embodiment, a weight average molecular weight of the first compound and the second compound may be within a range of about 100,000 to about 1,000,000.

In an exemplary embodiment, the first compound and the second compound may absorb light having a wavelength within a range of about 100 nm to about 300 nm.

In an exemplary embodiment, the diamine group may include at least one selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-diaminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene), 1,3-bis(4-aminophenoxy)benzene, 4,4'-bis(4-aminophenoxy)diphenylsulfone, 2,2-bis[4-(aminophenoxy)phenyl]propane, 2,2-bis(4-aminophenyl)hexafluoropropane, 2,2-bis[4-(4-aminophenoxyl)phenyl]hexafluoropropane, bis(4-aminocyclohexyl)methane, bis(4-amino-3-methylcyclohexyl)methane, tetramethylenediamine, hexamethylenediamine, 4,4'-diamino-3-dodecyldiphenyl ether and 1-dodecanoxy-2,4-diaminobenzene.

In an exemplary embodiment, the first substrate may include a first base substrate and a thin-film transistor disposed on the first base substrate. The second substrate may include a second base substrate and a column spacer disposed on the second base substrate.

In an exemplary embodiment, the column spacer may face the first alignment layer.

In an exemplary embodiment, the second substrate may include a second base substrate, a thin-film transistor disposed on the second base substrate.

In an exemplary embodiment, a column spacer may be disposed on the first alignment layer, and the column spacer may face the second alignment layer.

In accordance with an exemplary embodiment, a method of manufacturing a liquid crystal display panel is provided. According to the method, a first alignment layer is formed on a first substrate by coating a first compound comprising a first structural unit represented by the following Chemical Formula 1 and a second structural unit represented by the following Chemical Formula 2. A second alignment layer is formed on a second substrate facing the first substrate by coating a second compound comprising the first structural unit and the second structural unit. An equivalent of the first structural unit of the first compound is greater than an equivalent of the second structural unit of the first compound. An equivalent of the second structural unit of the second compound is greater than an equivalent of the first structural unit of the second compound.

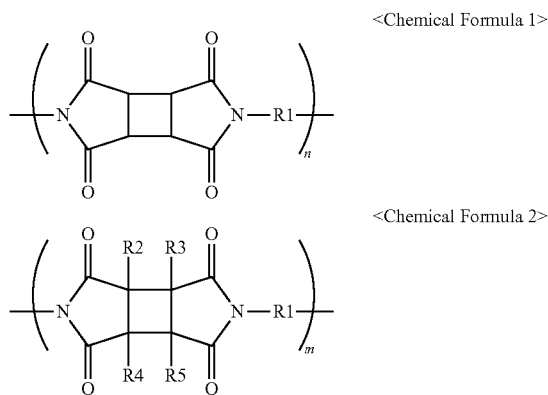

<Chemical Formula 1>

<Chemical Formula 2>

R1 represents a diamine group, R2, R3, R4, R5 respectively represents a hydrogen atom, a fluorine atom or an organic functional group having 1 to 5 carbons, and at least one of R2, R3, R4, R5 represents a fluorine atom or an organic functional group having 1 to 5 carbons.

In an exemplary embodiment, the method may further include combining the first substrate and the second substrate.

In an exemplary embodiment, the method may further include forming a liquid crystal layer by injecting a liquid crystal material between the first substrate and the second substrate.

In an exemplary embodiment, the first compound and the second compound may absorb light having a wavelength within a range of about 100 nm to about 300 nm.

In an exemplary embodiment, forming the first alignment layer may include coating the first compound on the first substrate, firstly baking the first substrate, irradiating ultraviolet light on the first compound and secondly baking the first substrate.

In an exemplary embodiment, forming the second alignment layer may include coating the second compound on the second substrate, firstly baking the second substrate, irradiating ultraviolet light on the second compound and secondly baking the second substrate.

In an exemplary embodiment, the method may further include forming a column spacer on the second alignment layer.

In an exemplary embodiment, the first compound and the second compound may be polymerized by cyclobutane-1,2,3,4-tetracarboxylic dianhydride, cyclobutane-1,2,3,4-tetracarboxylic dianhydride derivative and diamine compound.

In an exemplary embodiment, the diamine compound may include at least one selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-diaminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(aminophenoxy)phenyl]propane, 2,2-bis(4-aminophenyl)hexafluoropropane, 2,2-bis[4-(4-aminophenoxyl)phenyl]hexafluoropropane, bis(4-aminocyclohexyl)methane, bis(4-amino-3-methylcyclohexyl)methane, tetramethylenediamine, hexamethylenediamine, 4,4'-diamino-3-dodecyldiphenyl ether and 1-dodecanoxy-2,4-diaminobenzene.

In an exemplary embodiment, the first compound may be polymerized by cyclobutane-1,2,3,4-tetracarboxylic dianhydride and cyclobutane-1,2,3,4-tetracarboxylic dianhydride derivative. An equivalent of cyclobutane-1,2,3,4-tetracarboxylic dianhydride may be greater than an equivalent of cyclobutane-1,2,3,4-tetracarboxylic dianhydride derivative.

In an exemplary embodiment, the second compound may be polymerized by cyclobutane-1,2,3,4-tetracarboxylic dianhydride and cyclobutane-1,2,3,4-tetracarboxylic dianhydride derivative. An equivalent of cyclobutane-1,2,3,4-tetracarboxylic dianhydride may be less than an equivalent of cyclobutane-1,2,3,4-tetracarboxylic dianhydride derivative.

In accordance with an exemplary embodiment of the present invention, a method of manufacturing a liquid crystal display panel is provided. The method includes heating a first composition including cyclobutane-1,2,3,4-tetracarboxylic dianhydride, cyclobutane-1,2,3,4-tetracarboxylic dianhydride derivative, a diamine compound and a solvent at a temperature in a range from about 150° C. to about 450° C. to form a first compound including a first structural unit represented by the following Chemical Formula 1 and a second structural unit represented by the following Chemical Formula 2, in which an equivalent of the first structural unit of the first compound is greater than an equivalent of the second structural unit of the first compound, coating the first compound on a first substrate, firstly baking the first substrate having the first compound coated thereon, irradiating ultraviolet light on the first compound, and secondly baking the first substrate having the first compound coated thereon, thereby forming a first alignment layer including the first compound on the first substrate. In addition, the method further includes heating a second composition including cyclobutane-1,2,3,4-tetracarboxylic dianhydride, cyclobutane-1,2,3,4-tetracarboxylic dianhydride derivative, a diamine compound and a solvent at a temperature in a range from about 150° C. to about 450° C. to form a second compound comprising a first structural unit represented by the following Chemical Formula 1 and a second structural unit represented by the following Chemical Formula 2, in which an equivalent of the second structural unit of the second compound is greater than an equivalent of the first structural unit of the second compound, coating the second compound on a second substrate facing the first substrate, firstly baking the second substrate having the second compound coated thereon, irradiating ultraviolet light on the second compound, and secondly baking the second substrate having the second compound coated thereon, thereby forming a second alignment layer including the second compound on the second substrate.

Moreover, the method further includes forming a liquid crystal layer disposed between the first alignment layer and the second alignment layer,

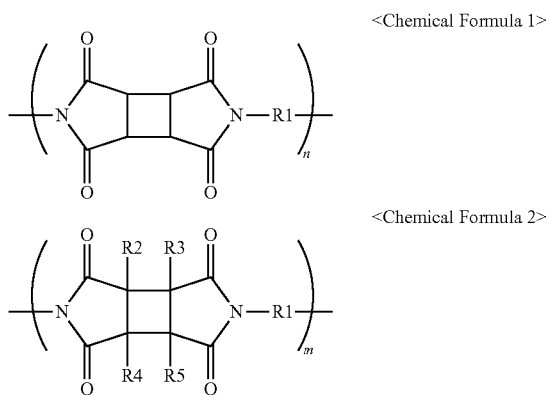

<Chemical Formula 1>

<Chemical Formula 2>

R1 represents a diamine group. R2, R3, R4, R5 respectively represents a hydrogen atom, a fluorine atom or an organic functional group having 1 to 5 carbons, and at least one of R2, R3, R4, R5 represents a fluorine atom or an organic functional group having 1 to 5 carbons.

In exemplary embodiments, the liquid crystal display panel includes an alignment layer including a polyimide compound on a substrate. The polyimide compound is formed by a composition including cyclobutane-1,2,3,4-tetracarboxylic dianhydride and a derivative thereof. Thus, an afterimage on the display panel decreases and a hardness of the alignment layer increases.

BRIEF DESCRIPTION OF THE DRAWINGS

Exemplary embodiments of the inventive concept will become more apparent by describing in detail exemplary embodiments thereof with reference to the accompanying drawings, in which.

DETAILED DESCRIPTION OF EXEMPLARY EMBODIMENTS OF THE INVENTIVE CONCEPT

Figure 1:
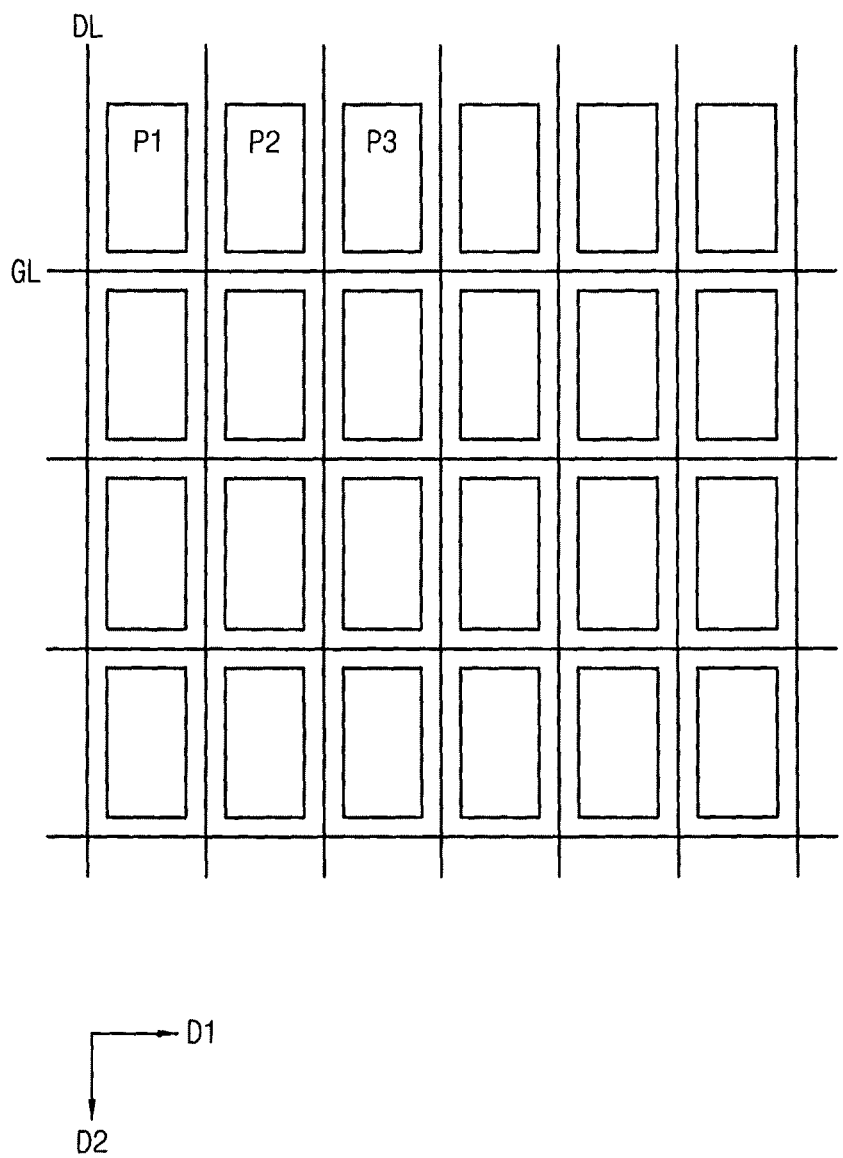
FIG. 1 is a plan view illustrating an exemplary embodiment of a liquid crystal display panel.

Exemplary embodiments of the inventive concept will be described more fully hereinafter with reference to the accompanying drawings, in which exemplary embodiments of the invention are shown. As those skilled in the art would realize, the described embodiments may be modified in various different ways, all without departing from the spirit or scope of the inventive concept.

In the drawings, the thickness of layers, films, panels, regions, etc. may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Hereinafter, exemplary embodiments of the inventive concept will be explained in detail with reference to the accompanying drawings.

Figure 2:
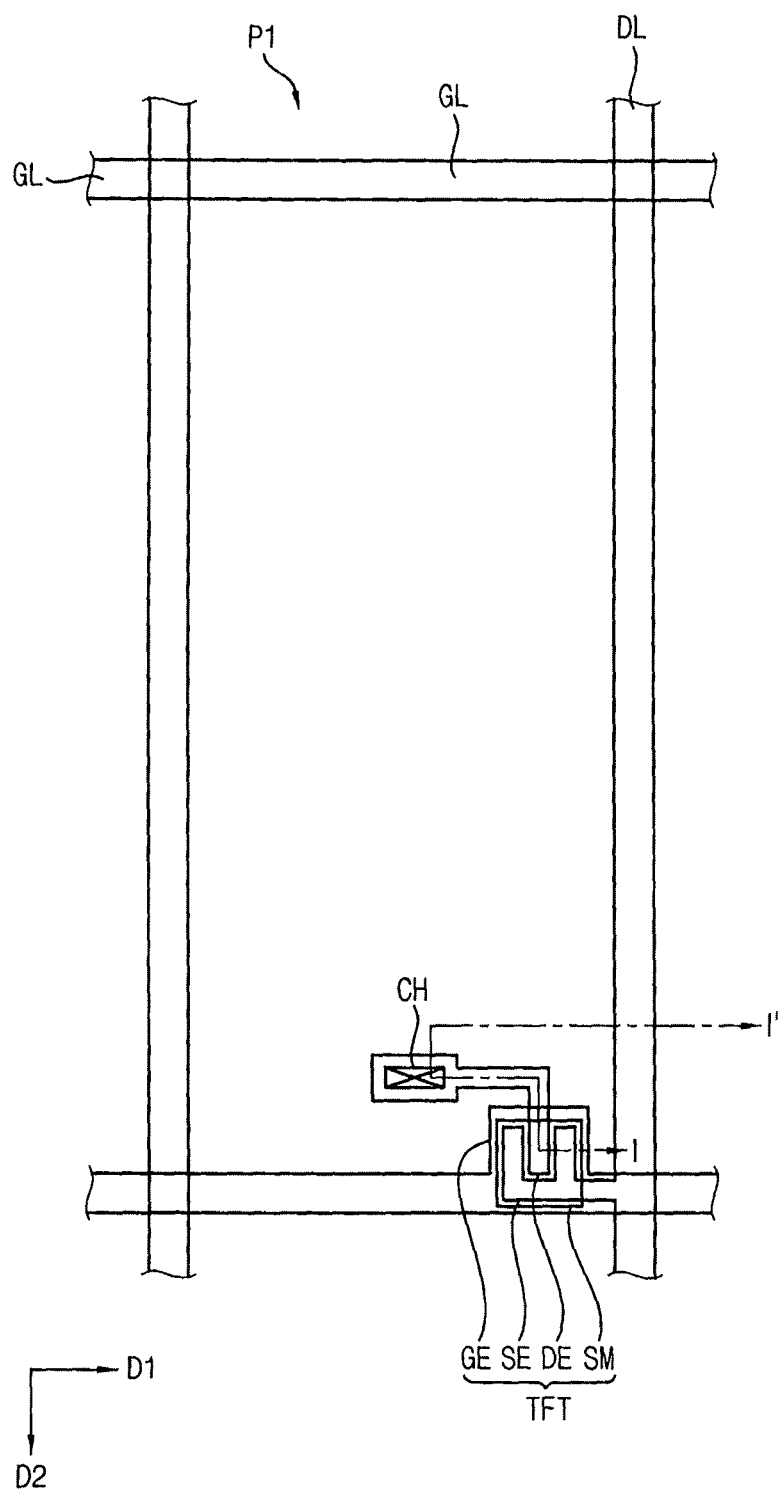
FIG. 2 is a plan view illustrating a first pixel of FIG. 1.
Figure 3:
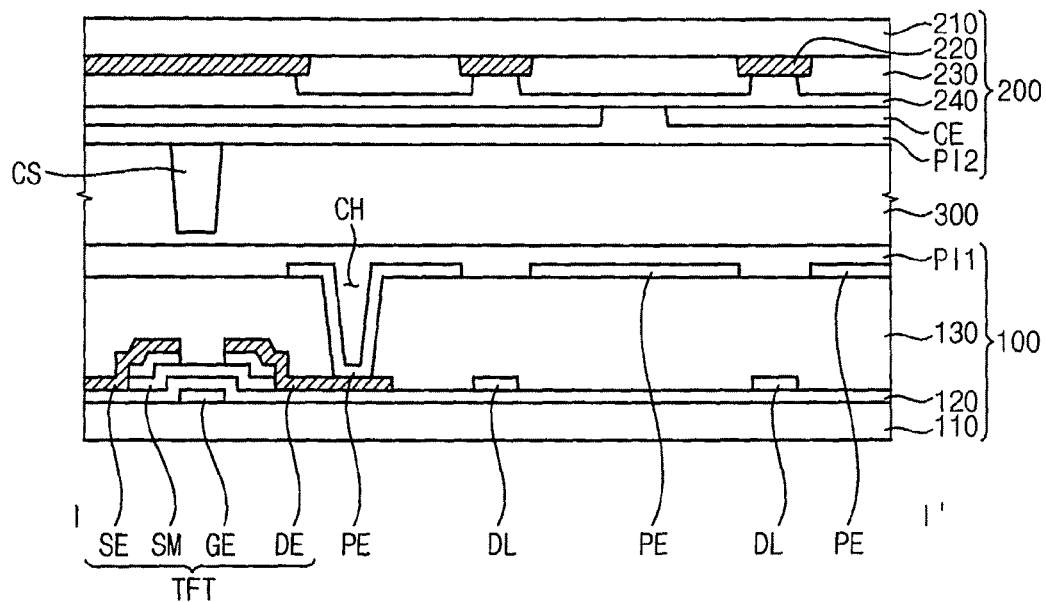
FIG. 3 is a cross-sectional view taken along the line I-I' in FIG. 2.

FIG. 1 is a plan view illustrating an exemplary embodiment of a liquid crystal display panel. FIG. 2 is a plan view illustrating a first pixel of FIG. 1. FIG. 3 is a cross-sectional view taken along the line I-I' in FIG. 2.

Referring to FIGS. 1 and 2, the liquid crystal display panel includes a plurality of gate lines GL, a plurality of data lines DL and a plurality of pixels.

The gate line GL may extend along a first direction D1. The data line DL may extend along a second direction D2 crossing the first direction D1. Alternatively, the gate line GL may extend along the second direction D2 and the data line DL may extend along the first direction D1.

The pixels may be arranged, for example, in a matrix shape. The pixels may be disposed in areas defined by the gate lines GL and the data lines DL.

Each pixel may be connected to a corresponding gate line GL and a corresponding data line DL adjacent to the pixel.

Each pixel may have, for example, a rectangle shape extending in the second direction D2. Alternatively, the pixel may have, for example, a V-shape, a Z-shape, etc.

Referring to FIGS. 1 to 3, the liquid crystal display panel includes a first substrate 100, a second substrate 200 and a liquid crystal layer 300.

The first substrate 100 includes, for example, a first base substrate 110, a thin film transistor TFT disposed on the first base substrate 110, a gate insulation layer 120, a data insulation layer 130, a pixel electrode PE and a first alignment layer PI1.

The first base substrate 110 may be a transparent insulation substrate. Examples of the transparent insulation substrate may include, but are not limited to, a glass substrate, a quartz substrate, or a plastic substrate, etc. Further, in an exemplary embodiment, the first base substrate 110 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof. The first base substrate 110 may include a plurality of pixel areas for displaying an image. A plurality of the pixel areas may be disposed in, for example, a matrix shape having a plurality of rows and a plurality of columns.

Each pixel may further include a switching element. For example, the switching element may be the thin film transistor TFT. The switching element may be connected to the gate line GL and the data line DL adjacent to the switching element. The switching element may be disposed at a crossing area of the gate line GL and the data line DL.

A gate pattern may be disposed on the first base substrate 110. The gate pattern may include a gate electrode GE and the gate line GL. The gate line GL is electrically connected to the gate electrode GE.

The gate insulation layer 120 may be disposed on the first base substrate 110 to cover the gate pattern and may insulate the gate pattern.

A semiconductor pattern SM may be disposed on the gate insulation layer 120. The semiconductor pattern SM may overlap the gate electrode GE. In an exemplary embodiment, the semiconductor pattern SM made of, for example, amorphous silicon, polysilicon, or the like. Alternatively, in an embodiment, the semiconductor pattern SM may include, for example, an oxide semiconductor. For example, the oxide semiconductor can be made of an oxide material including indium, zinc, tin, gallium, lead, germanium, cadmium, or an oxide compound thereof, such as indium gallium zinc oxide, indium zinc oxide and zinc tin oxide, but exemplary embodiments are not limited thereto.

A data pattern may be disposed on the semiconductor pattern SM, which is formed on the gate insulation layer 120. The data pattern may include a data line DL, a source electrode SE and a drain electrode DE. The source electrode SE may overlap the semiconductor pattern SM. The source electrode SE may be electrically connected to the data line DL.

The drain electrode DE may be spaced apart from the source electrode SE on the semiconductor pattern SM. The semiconductor pattern SM may have a conductive channel between the source electrode SE and the drain electrode DE.

The TFT may include the gate electrode GE, the source electrode SE, the drain electrode DE and the semiconductor pattern SM.

The gate insulation layer 120 may be disposed on a whole surface of the first base substrate 110.

The gate insulation layer 120 may include, for example, silicon oxide (SiOx), silicon nitride (SiNx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof. The gate insulation layer 120 may have a single-layered structure or a multiple-layered structure. For example, the gate insulation layer 120 may include a first layer disposed on the gate electrode GE and a second layer disposed on the first layer. The first layer may include, for example, silicon nitride (SiNx). The second layer may include, for example, silicon oxide (SiOx).

The data insulation layer 130 may be disposed on the gate insulation layer 120 to cover the data pattern and may insulate the data pattern.

The data insulation layer 130 may be disposed on the gate line GL, the data line DL and the switching element.

The data insulation layer 130 may be disposed on a whole surface of the first base substrate 110. The data insulation layer 130 may flatten an upper surface of the first substrate 100.

The data insulation layer 130 may include an organic insulation material or an inorganic insulation material. For example, the organic insulation material may have a great property of flattening and a photosensitivity, and the inorganic insulation material may include silicon oxide (SiOx) or silicon nitride (SiNx). The data insulation layer 130 may have a single-layered structure or a multiple-layered structure. For example, the data insulation layer 130 may include a first layer disposed on the data pattern and a second layer disposed on the first layer. The first layer may include, for example, the inorganic insulation material. The second layer may include, for example, the organic insulation material.

The pixel electrode PE may be disposed on the data insulation layer 130. The pixel electrode PE may be electrically connected to the thin film transistor TFT by a contact hole CH. The pixel electrode PE may be disposed in a pixel area. A gray scale voltage is applied to the pixel electrode PE through the thin film transistor TFT.

For example, the pixel electrode PE may include a transparent conductive material such as indium tin oxide ("ITO"), indium zinc oxide ("IZO"), aluminum zinc oxide ("AZO"), cadmium tin oxide ("CTO"), or a combination thereof. For example, the pixel electrode PE may include a slit pattern.

The first alignment layer PI1 may be disposed on the data insulation layer 130 and the pixel electrode PE. The first alignment layer PI1 may be disposed on a whole surface of the first base substrate 110.

The first alignment layer PI1 may align a liquid crystal molecule of the liquid crystal layer 300.

The first alignment layer PI1 may be disposed between the first substrate 100 and the liquid crystal layer 300.

The first alignment layer PI1 may include a first compound. The first compound may include, for example, a first structural unit represented by the following Chemical Formula 1 and a second structural unit represented by the following Chemical Formula 2

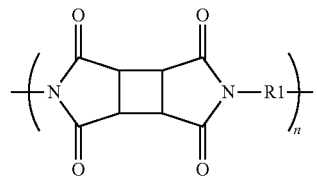

<Chemical Formula 1>

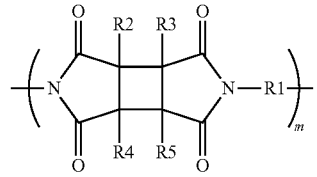

<Chemical Formula 2>

R1 represents a diamine group, R2, R3, R4, R5 respectively represents a hydrogen atom, a fluorine atom or an organic functional group having 1 to 5 carbons, at least one of R2, R3, R4, R5 represents a fluorine atom or an organic functional group having 1 to 5 carbons.

For example, the diamine group may include p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-diaminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene), 1,3-bis(4-aminophenoxy)benzene, 4,4'-bis(4-aminophenoxy)diphenylsulfone, 2,2-bis[4-(aminophenoxy)phenyl]propane, 2,2-bis(4-aminophenyl)hexafluoropropane, 2,2-bis[4-(4-aminophenoxyl)phenyl]hexafluoropropane, bis(4-aminocyclohexyl)methane, bis(4-amino-3-methylcyclohexyl)methane, tetramethylenediamine, hexamethylenediamine, 4,4'-diamino-3-dodecyldiphenyl ether and 1-dodecanoxy-2,4-diaminobenzene.

The first compound may be, for example, a polyimide compound. The first compound may include, for example, a first structural unit represented by the following Chemical Formula 1 and a second structural unit represented by the following Chemical Formula 2. The first structural unit may include, for example, cyclobutane dianhydride. The second structural unit may include, for example, cyclobutane dianhydride derivative.

An equivalent of the first structural unit of the first compound may be greater than an equivalent of the second structural unit of the first compound.

For example, the equivalent of the first structural unit of a total equivalent of the first structural unit and the second structural unit may be greater than 50%.

The first structural unit may not include a side chain. When the first structural unit of the first compound is greater than the second structural unit of the first compound, a packing between molecules generates. Thus, a density of the alignment layer may increase, so that a hardness of the alignment layer may be increased.

The second structural unit may include a side chain. When the second structural unit of the first compound is greater than the first structural unit of the first compound, a packing between molecules merely generates. A molecular structure of the first compound may be unstable. When ultraviolet irradiates to the first compound, a cleavage of the first compound may occur relatively easily. Thus, an optically anisotropic of the alignment layer may increase, and an afterimage of the display panel may decrease.

Therefore, the first compound may include the first structural unit more than the second structural unit, so that a hardness of the alignment layer may be increased. The first compound may include, for example, a third structural unit represented by the following Chemical Formula 3.

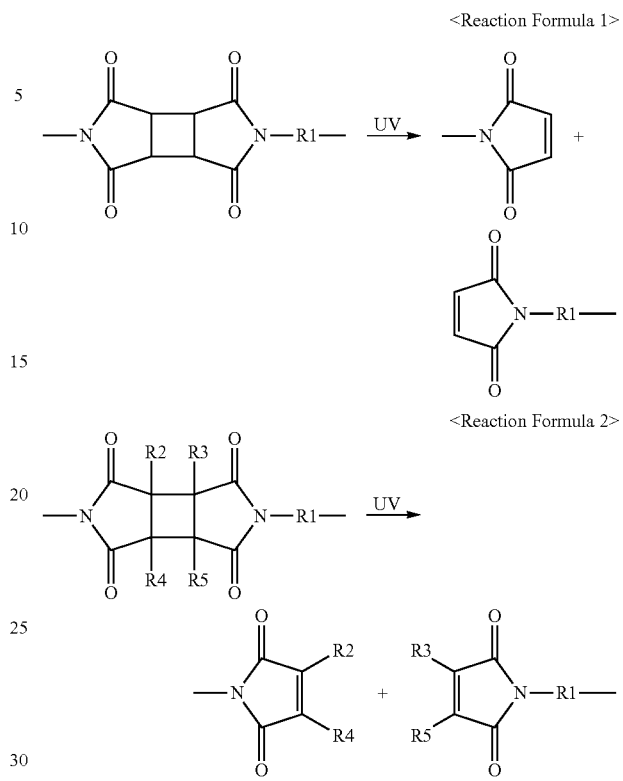

<Reaction Formula 1>

<Reaction Formula 2>

A polarizing plate may be disposed on a lower surface of the first substrate 100, and then the ultraviolet may be irradiated to the first compound. Thus, the ultraviolet may be polarized, and the polarized ultraviolet may be irradiated to the first compound.

<Chemical Formula 3>

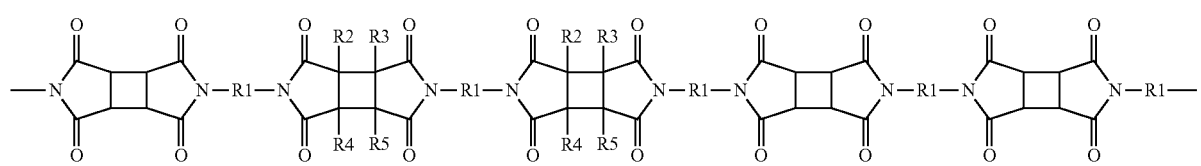

A weight-average molecular weight of the first compound may be within a range of, for example, about 100,000 to about 1,000,000. For example, the weight-average molecular weight of the first compound may be more than or equal to about 500,000. When the weight-average molecular weight of the first compound is less than 100,000, a strain on the display panel may occur.

The first compound may absorb light having a wavelength range of about 100 nm to about 400 nm. For example, the first compound may absorb light having a wavelength of 254 nm.

When the first compound absorbs light having a specific wavelength, the first structural unit and the second structural unit may be respectively cleaved by the following Reaction Formula 1 and the following Reaction Formula 2.

Molecules of the first compound aligned along a polarizing direction may be cleaved, so that anisotropy of the first alignment layer may increase. The cleaved molecules of the first compound may be rearranged in a direction perpendicular to the polarizing direction, so that an orientation of the first alignment may increase.

The second substrate 200 includes, for example, a second base substrate 210, a black matrix 220 disposed on the second base substrate 210, a color filter 230, an over-coating layer 240, a common electrode CE, a second alignment layer PI2 and a column spacer CS.

The second base substrate 210 may be, for example, a transparent insulation substrate. For example, the second base substrate 210 may be a glass substrate, a quartz substrate, or a transparent plastic substrate. Further, in an exemplary embodiment, the second base substrate 210 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The black matrix 220 may be disposed on the second base substrate 210. The black matrix 220 may block light passing through an area corresponding to a signal line connected to the thin-film transistor TFT.

The black matrix 220 may be disposed on the gate line GL, the data line DL and the switching element. The black matrix 220 may overlap with a plurality of gate lines GL extended along a first direction, and a plurality of data lines DL extended along a second direction perpendicular to the first direction, so that the black matrix 220 may block light. The black matrix 220 may be disposed on a border between pixel areas adjacent to each other.

For example, the black matrix 220 may include a photosensitive organic material having a pigment, such as carbon black.

The color filter 230 may be disposed on the second base substrate 210 and the black matrix 220.

The color of light may be changed by the color filter 230 and the light may be transmitted to the liquid crystal layer 300 through the color filter 230. The color filter 230 may include a red color filter, a green color filter and a blue color filter. Each color filter 230 may correspond to one of the pixel areas. Adjacent color filters may have different colors from each other.

The second alignment layer PI2 may include a second compound. The second compound may include, for example, a first structural unit represented by the Chemical Formula 1 and a second structural unit represented by the Chemical Formula 2.

The second compound may be, for example, a polyimide compound. The second compound may include, for example, a first structural unit represented by the Chemical Formula 1 and a second structural unit represented by the Chemical Formula 2. The first structural unit may include, for example, cyclobutane dianhydride. The second structural unit may include, for example, cyclobutane dianhydride derivative.

An equivalent of the second structural unit of the second compound may be greater than an equivalent of the first structural unit of the second compound.

For example, the equivalent of the second structural unit of a total equivalent of the first structural unit and the second structural unit may be greater than 50%.

Therefore, the second compound may include the second structural unit more than the first structural unit, so that an optical anisotropy of the alignment layer may increase. The second compound may include, for example, a fourth structural unit represented by the following Chemical Formula 4.

<Chemical Formula 4>

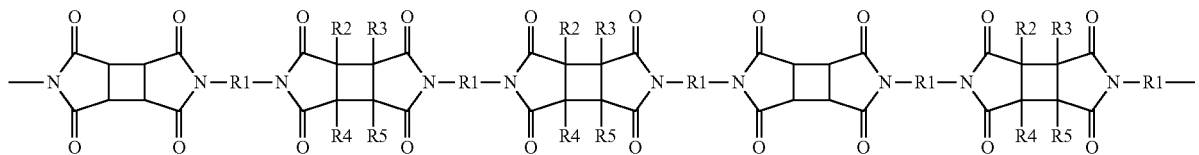

The color filters 230 may be spaced apart from a border between the corresponding pixel areas adjacent to each other. The black matrix 220 may be disposed on the border between the corresponding pixel areas adjacent to each other.

The over-coating layer 240 may be disposed on the second base substrate 210 and is configured to flatten an upper surface of the second substrate 200. For example, the over-coating layer 240 may be disposed on the black matrix 220 and the color filter 230.

The over-coating layer 240 may include an organic insulation material or an inorganic insulation material. For example, the over-coating layer 240 may include an organic insulation material having an excellent flattening property and a photosensitivity, or include an inorganic insulation material, such as silicon oxide (SiOx) and silicon nitride (SiNx).

The common electrode CE may be disposed on the over-coating layer 240. The common electrode CE may include, for example, a transparent conductive material, such as indium tin oxide ("ITO"), indium zinc oxide ("IZO"), aluminum zinc oxide ("AZO"), cadmium tin oxide ("CTO"), or a combination thereof.

The second alignment layer PI2 may be disposed on the over-coating layer 240 and the common electrode CE. The second alignment layer PI2 may be disposed on a whole surface of the second base substrate 210.

The second alignment layer PI2 may be disposed between the second substrate 200 and the liquid crystal layer 300.

A weight-average molecular weight of the second compound may be within a range of, for example, about 100,000 to about 1,000,000. For example, the weight-average molecular weight of the second compound may be more than or equal to about 500,000. When the weight-average molecular weight of the second compound is less than 100,000, a strain on the display panel may occur.

The second compound may absorb light having a wavelength range of about 100 nm to about 400 nm. For example, the second compound may absorb light having a wavelength of 254 nm.

When the second compound absorbs light having a specific wavelength, the first structural unit and the second structural unit may be respectively cleaved as illustrated in the Reaction Formula 1 and the Reaction Formula 2.

A polarizing plate may be disposed on an upper surface of the second substrate 200, and then the ultraviolet may be irradiated to the second compound. Thus, the ultraviolet may be polarized, and the polarized ultraviolet may be irradiated to the second compound.

Molecules of the second compound aligned along a polarizing direction may be cleaved, so that anisotropy of the second alignment layer may increase. The cleaved molecules of the second compound may be rearranged in a direction perpendicular to the polarizing direction, so that an orientation of the second alignment may increase.

The column spacer CS may be disposed on the second alignment layer PI2.

A photosensitive organic material may be coated on the second alignment layer PI2, and then the column spacer CS may be formed by, for example, a photo process. Alternatively, the column spacer CS may be formed by, for example, a ball spacer through a scattering method.

The liquid crystal layer 300 may be disposed between the first substrate 100 and the second substrate 200. The liquid crystal layer 300 may include a liquid crystal molecule. An alignment of the liquid crystal molecule in the liquid crystal layer 300 may be controlled by the electric field generated between the pixel electrode PE and the common electrode CE, thereby controlling a light transmittance of the pixel.

The liquid crystal display panel may further include the first polarizing plate disposed on a lower surface of the first substrate 100, and the second polarizing plate disposed on an upper surface of the second substrate 200.

The first polarizing plate may polarize light provided from a backlight assembly. The first polarizing plate may have a first polarizing axis. Therefore, the first polarizing plate may allow light having the first polarizing axis to pass therethrough among the light provided from the backlight assembly.

The second polarizing plate may polarize light which passes through the color filter 230. The second polarizing plate may have a second polarizing axis. The second polarizing axis may be perpendicular to the first polarizing axis. Therefore, the second polarizing plate may allow light having the second polarizing axis to pass therethrough among light from the color filter 230.

Figure 4:
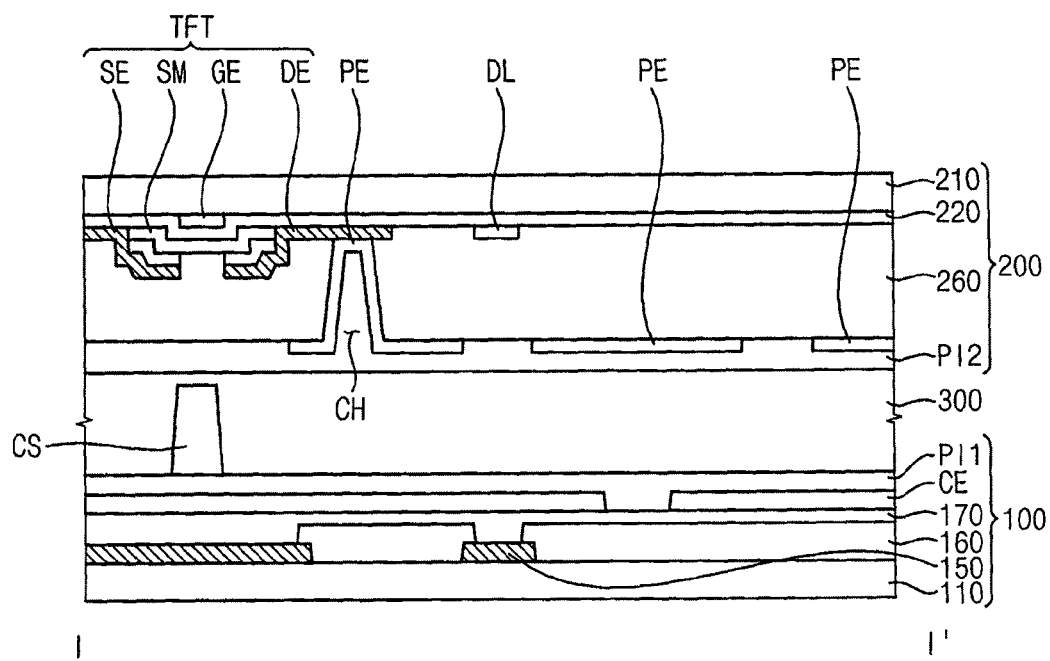
FIG. 4 is a cross-sectional view taken along the line I-I' in FIG. 2.

FIG. 4 is a cross-sectional view taken along the line I-I' in FIG. 2.

Referring to FIGS. 1 to 4, the liquid crystal display panel includes a first substrate 100, a second substrate 200 and a liquid crystal layer 300.

The liquid crystal display panel illustrated in FIG. 4 is substantially the same as the liquid crystal display panel illustrated in FIGS. 1 to 3 except for a black matrix and a color filter disposed on a first base substrate, a thin-film transistor disposed on a second base substrate, and a column spacer disposed on the thin-film transistor. The same or like elements shown in FIG. 4 have been labeled with the same reference characters as used above to describe the exemplary embodiments of the liquid crystal display apparatus shown in FIGS. 1 to 3, and any repetitive detailed description thereof will be omitted or simplified.

The first substrate 100 includes a first base substrate 110, a black matrix 140 disposed on the first base substrate 110, a color filter 150, an over-coating layer 160, a common electrode CE, a first alignment layer PI1 and a column spacer CS.

The black matrix 140 may be disposed on the first base substrate 110.

The color filter 150 may be disposed on the first base substrate 110 and the black matrix 140.

The over-coating layer 160 may be disposed on the first base substrate 110 and is configured to flatten an upper surface of the first substrate 100. For example, the over-coating layer 160 may be disposed on the black matrix 140 and the color filter 150.

The common electrode CE may be disposed on the over-coating layer 160.

The first alignment layer PI1 may be disposed on the over-coating layer 160 and the common electrode CE. The first alignment layer PI1 may be disposed on a whole surface of the first base substrate 110.

The first alignment layer PI1 may be disposed between the first substrate 100 and the liquid crystal layer 300.

The first alignment layer PI1 may include a first compound. The first compound may include, for example, a first structural unit represented by the Chemical Formula 1 and a second structural unit represented by the Chemical Formula 2.

The second substrate 200 includes, for example, a second base substrate 210, a thin-film transistor TFT disposed on the second base substrate 210, a gate insulation layer 250, a data insulation layer 260, a pixel electrode PE and a second alignment layer PI2.

The second base substrate 210 may be, for example, a transparent insulation substrate. Examples of the transparent insulation substrate may include, but are not limited to, a glass substrate, a quartz substrate, or a plastic substrate, etc. The second base substrate 210 may include a plurality of pixel areas for displaying an image. A plurality of the pixel areas may be disposed in, for example, a matrix shape having a plurality of rows and a plurality of columns.

A gate pattern may be disposed on the second base substrate 210. The gate pattern may include a gate electrode GE and the gate line GL. The gate line GL is electrically connected to the gate electrode GE.

The gate insulation layer 250 may be disposed on the second base substrate 210 to cover the gate pattern and may insulate the gate pattern.

A semiconductor pattern SM may be disposed on the gate insulation layer 250.

The data insulation layer 260 may be disposed on the gate insulation layer 250 to cover the data pattern and may insulate the data pattern.

The pixel electrode PE may be disposed on the data insulation layer 260.

The second alignment layer PI2 may be disposed on the data insulation layer 260 and the pixel electrode PE. The second alignment layer PI2 may be disposed on a whole surface of the second base substrate 210.

The second alignment layer PI2 may be disposed between the second substrate 200 and the liquid crystal layer 300.

Figure 5:
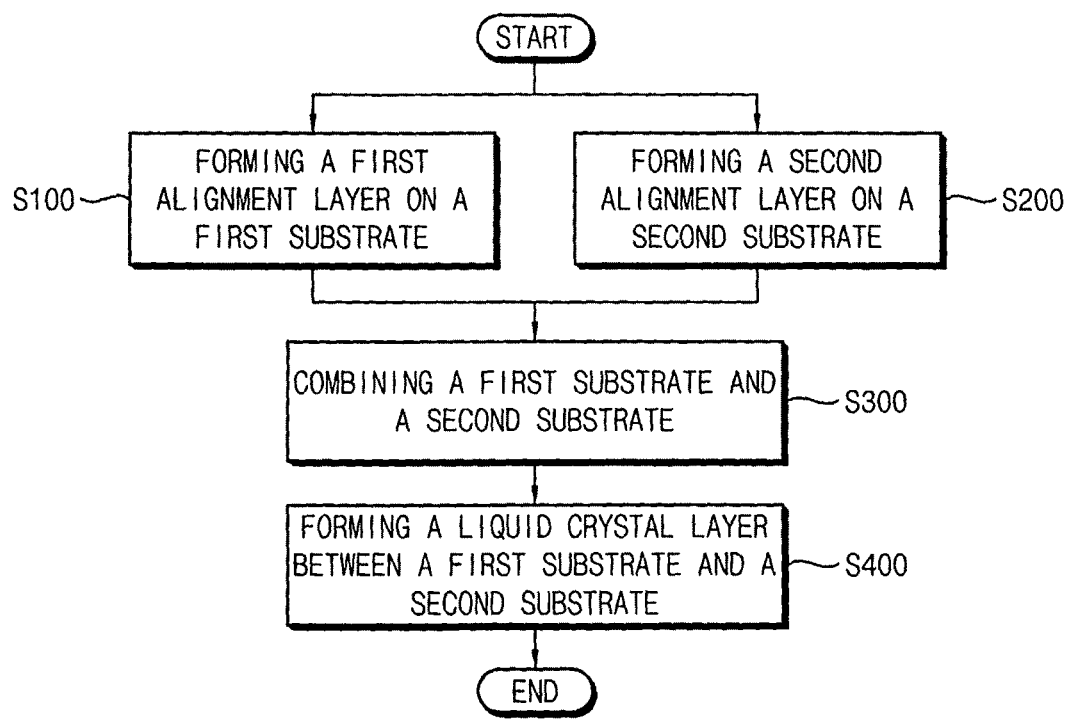
FIG. 5 is a diagram illustrating an exemplary embodiment of a method of manufacturing a liquid crystal display panel.

FIG. 5 is a diagram illustrating an exemplary embodiment of a method of manufacturing a liquid crystal display panel.

Referring to FIGS. 1 to 5, a method of manufacturing a liquid crystal display panel is disclosed. The method includes, for example, forming a first alignment layer on a first substrate S100, forming a second alignment layer on a second substrate S200, combining the first substrate and the second substrate S300, and forming a liquid crystal layer by injecting a liquid crystal material between the first substrate and the second substrate S400.

A first compound including, for example, a first structural unit represented by the Chemical Formula 1 and a second structural unit represented by the Chemical Formula 2 may be coated on the first substrate 100, thereby forming a first alignment layer PI1. An equivalent of the first structural unit may be greater than an equivalent of the second structural unit.

For example, the first compound may be coated by a slit coating, a spin coating or the like.

The first compound may be, for example, coated on the first substrate, and then the first substrate may be baked firstly. The first compound may be exposed by, for example, ultraviolet light, and then the first substrate may be, for example, baked secondly.

The first compound may be polymerized by, for example, cyclobutane-1,2,3,4-tetracarboxylic dianhydride, cyclobutane-1,2,3,4-tetracarboxylic dianhydride derivative and a diamine compound.

For example, the diamine compound may be p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-diaminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(aminophenoxy)phenyl]propane, 2,2-bis(4-aminophenyl)hexafluoropropane, 2,2-bis[4-(4-aminophenoxyl)phenyl]hexafluoropropane, bis(4-aminocyclohexyl)methane, bis(4-amino-3-methylcyclohexyl)methane, tetramethylenediamine, hexamethylenediamine, 4,4'-diamino-3-dodecyldiphenyl ether and 1-dodecanoxy-2,4-diaminobenzene A composition for polymerizing the first compound may include, for example, cyclobutane-1,2,3,4-tetracarboxylic dianhydride, cyclobutane-1,2,3,4-tetracarboxylic dianhydride derivative, a diamine compound and a solvent. The composition may be, for example, heated at a temperature range of about 150° C. to about 450° C.

An equivalent of cyclobutane-1,2,3,4-tetracarboxylic dianhydride, cyclobutane-1,2,3,4-tetracarboxylic dianhydride derivative is the same as an equivalent of the diamine compound.

The first compound may be polymerized by, for example, cyclobutane-1,2,3,4-tetracarboxylic dianhydride and cyclobutane-1,2,3,4-tetracarboxylic dianhydride derivative, and an equivalent of cyclobutane-1,2,3,4-tetracarboxylic dianhydride may be greater than an equivalent of cyclobutane-1,2,3,4-tetracarboxylic dianhydride derivative. Thus, the first compound may include the first structural unit more than the second structural unit.

Therefore, the first compound having a desired weight-average molecular weight may be polymerized by controlling each equivalent.

The first compound may be, for example, coated on the first substrate 100, and then the first compound may be, for example, baked firstly. The solvent of the first compound may be dried by, for example, a first bake process. The first compound may be, for example, heated or dried at a room temperature.

The first compound may be exposed by the ultraviolet light. Thus, the first compound may be cleaved, so that the first alignment layer may be rearranged.

The first compound may be, for example, baked secondly. A molecule having a small weight-average molecular weight may be, for example, dried by a second bake process. The first compound may be, for example, heated or dried at a room temperature, thereby forming the first alignment layer.

A second compound including, for example, a first structural unit represented by the Chemical Formula 1 and a second structural unit represented by the Chemical Formula 2 may be coated on the second substrate 200, thereby forming a second alignment layer PI2. An equivalent of the second structural unit may be greater than an equivalent of the first structural unit.

For example, the second compound may be coated by a slit coating, a spin coating or the like.

The second compound may be, for example, coated on the second substrate, and then the second substrate may be, for example, baked firstly. The second compound may be exposed by, for example, ultraviolet light, and then the second substrate may be, for example, baked secondly.

The second compound may be polymerized by, for example, cyclobutane-1,2,3,4-tetracarboxylic dianhydride, cyclobutane-1,2,3,4-tetracarboxylic dianhydride derivative and a diamine compound.

A composition for polymerizing the second compound may include, for example, cyclobutane-1,2,3,4-tetracarboxylic dianhydride, cyclobutane-1,2,3,4-tetracarboxylic dianhydride derivative, a diamine compound and a solvent. The composition may be, for example, heated at a temperature range of about 150° C. to about 450° C.

An equivalent of cyclobutane-1,2,3,4-tetracarboxylic dianhydride, cyclobutane-1,2,3,4-tetracarboxylic dianhydride derivative is the same as an equivalent of the diamine compound.

The second compound may be polymerized by, for example, cyclobutane-1,2,3,4-tetracarboxylic dianhydride and cyclobutane-1,2,3,4-tetracarboxylic dianhydride derivative, and an equivalent of cyclobutane-1,2,3,4-tetracarboxylic dianhydride derivative may be greater than an equivalent of cyclobutane-1,2,3,4-tetracarboxylic dianhydride. Thus, the second compound may include the second structural unit more than the first structural unit.

Therefore, the second compound having a desired weight-average molecular weight may be polymerized by controlling each equivalent.

The second compound may be, for example, coated on the second substrate 200, and then the second compound may be, for example, baked firstly. The solvent of the second compound may be dried by, for example, a first bake process. The second compound may be, for example, heated or dried at a room temperature.

The second compound may be exposed by, for example, the ultraviolet light. Thus, the second compound may be cleaved, so that the second alignment layer may be rearranged.

The second compound may be, for example, baked secondly. A molecule having a small weight-average molecular weight may be dried by, for example, a second bake process. The second compound may be, for example, heated or dried at a room temperature, thereby forming the second alignment layer.

The column spacer CS may be formed on the second alignment layer PI2.

For example, a photosensitive organic material may be coated on the second alignment layer PI2, and then the column spacer CS may be formed by a photo process. Alternatively, the column spacer CS may be formed by, for example, a ball spacer through a scattering method.

The first alignment layer PI1 and the second alignment layer PI2 may be formed, and then the first substrate 100 and the second substrate 200 may be combined.

The liquid crystal layer 300 may be formed between the first substrate 100 and the second substrate 200. A liquid crystal material may be injected between the first substrate and the second substrate, thereby forming the liquid crystal layer 300.

According to an exemplary embodiment, a liquid crystal display panel and a method of manufacturing the same may be used for a liquid crystal display apparatus, an organic light emitting apparatus or the like.

Having described exemplary embodiments of the inventive concept, it is further noted that it is readily apparent to those of ordinary skill in the art that various modifications may be made without departing from the spirit and scope of the invention which is defined by the metes and bounds of the appended claims.

What is claimed is:

1. A liquid crystal display panel comprising:
a first substrate;
a second substrate facing the first substrate;
a first alignment layer disposed on the first substrate, wherein the first alignment layer comprises a first compound comprising a first structural unit represented by the following Chemical Formula 1 and a second structural unit represented by the following Chemical Formula 2, wherein an equivalent of the first structural unit of the first compound is greater than an equivalent of the second structural unit of the first compound;
a second alignment layer disposed on the second substrate, wherein the second alignment layer comprises a second compound comprising the first structural unit and the second structural unit, wherein an equivalent of the second structural unit of the second compound is greater than an equivalent of the first structural unit of the second compound, wherein a hardness of the first alignment layer is greater than a hardness of the second alignment layer and an optical anisotropy of the second alignment layer is greater than an optical anisotropy of the first alignment layer; and
a liquid crystal layer disposed between the first alignment layer and the second alignment layer,

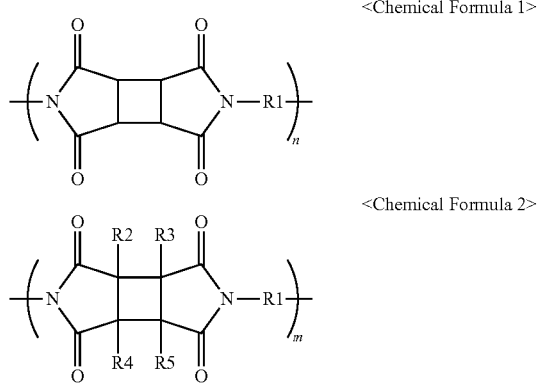

<Chemical Formula 1>

<Chemical Formula 2> wherein, R1 represents a diamine group, wherein R2, R3, R4, R5 respectively represents a hydrogen atom, a fluorine atom or an organic functional group having 1 to 5 carbons, and wherein at least one of R2, R3, R4, R5 represents a fluorine atom or an organic functional group having 1 to 5 carbons.

2. The display panel of claim 1, wherein a weight average molecular weight of the first compound and the second compound is within a range of about 100,000 to about 1,000,000.

3. The display panel of claim 1, wherein the first compound and the second compound absorb light having a wavelength within a range of about 100 nm to about 300 nm.

4. The display panel of claim 1, wherein the diamine group comprises at least one selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminobiphenylmethane, diaminodiphenylether, 2,2'-diaminodiphenylpropane, bis(3,5-diethyl-4-diaminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene), 1,3-bis(4-aminophenoxy)benzene, 4,4'-bis(4-aminophenoxy) diphenylsulfone, 2,2-bis[4-(aminophenoxy)phenyl]propane, 2,2-bis(4-aminophenyl) hexafluoropropane, 2,2-bis[4-(4-aminophenoxy) phenyl]hexaflouropropane, bis(4-aminocyclohexyl)methane, bis(4-amino-3-methylcyclohexyl)methane, tetramethylenediamine, hexamethylenediamine, 4,4'-diamino-3-dodecyldiphenyl ether and 1-dodecanoxy-2,4-diaminobenzene.

5. The display panel of claim 1, wherein the first substrate comprises a first base substrate and a thin-film transistor disposed on the first base substrate, and the second substrate comprises a second base substrate and a column spacer disposed on the second base substrate.

6. The display panel of claim 5, wherein the column spacer faces the first alignment layer.

7. The display panel of claim 1, wherein the second substrate comprises a second base substrate, and a thin-film transistor disposed on the second base substrate.

8. The display panel of claim 7, further comprising a column spacer disposed on the first alignment layer, and wherein the column spacer faces the second alignment layer.

* * * * *